UNITED STATES PATENT OFFICE.

EMILE LÉON BLOCH-PIMENTEL, OF PARIS, FRANCE.

CELLULOSE COMPOUND AND METHOD OF MAKING THE SAME.

1,234,720.   Specification of Letters Patent.   Patented July 31, 1917.

No Drawing.   Application filed June 24, 1915.  Serial No. 36,158.

*To all whom it may concern:*

Be it known that I, EMILE LÉON BLOCH-PIMENTEL, a citizen of the Republic of France, residing at Paris, France, have invented certain new and useful Improvements in Cellulose Compounds and Methods of Making the Same, of which the following is a specification.

The present invention has for its object a new cellulose compound, and a method of preparing said compound. I have found that by submitting cellulose to the action of trioxymethylene in the presence of a condensing agent, such as ferric chlorid, or organic acids (to either of which may be added if desired, a dehydrating agent, such as alum or calcium chlorid) there will be produced a material which I believe to be a new chemical compound, and which I believe consists of an addition product of cellulose and trioxymethylene. Instead of using ready formed trioxymethylene, it is advantageous to employ the compounds from which trioxymethylene will be produced, whereby the trioxymethylene, at the moment of its formation, readily combines with the cellulose.

The new compounds, being addition products of cellulose, have more weight than the cellulose from which the same were produced. These products are capable of hydrolysis by means of strong acid, this reaction forming free formic acid.

The simplest mode of preparing these compounds from cellulose, consists in directly preparing, in the presence of the cellulose, the trioxymethylene which is to enter into the reaction.

In order to more completely illustrate my invention the following examples are given.

*Example 1.*

Cellulose is treated with formaldehyde, in the presence of ferric chlorid, the material is then dried down in vacuum, as much as possible, and after desiccation it is heated in an oven. In the first phase of the reaction there is formed trioxymethylene, which thereupon reacts with the cellulose, in the presence of chlorid of iron forming the second phase of the reaction.

*Example 2.*

Cellulose is treated with formaldehyde in the presence of an organic acid, with or without dehydrating agents, such as alum or calcium chlorid. The reaction mixture is then dried in a vacuum to constant weight, and is heated in an oven. The product produced is similar to that produced in Example 1.

Instead of operating upon pure cellulose, I may start with cellulose bodies which are employed industrially such as artificial textiles (artificial silk, artificial horse hair and the like), pellicles, films, molded objects, whereby these materials can be transformed, either superficially or throughout their entire mass, by the described process. The products so treated do not lose their original appearance and retain their original strength, while their resistance to aqueous liquids or water is increased, which results are particularly interesting in the case of artificial textiles, cellulosic pellicles and the like, obtained from known solutions, such as collodion, cuprammonium solution, viscose or the like.

The proportions of the reacting materials may be those calculated formulas of the bodies, cellulose having a molecular weight of 486, and trioxymethylene having a molecular weight of 90. It is not necessary to use large amounts of the condensing agents or the dehydrating agents. The proportions both of the principal materials, and the condensing and dehydrating agents may be varied more or less depending upon the particular effect to be secured. The temperatures in the two phases of the reaction can be varied more or less, but obviously the highest temperature employed should not be sufficiently high to injure the product.

What I claim is:

1. A process of making compounds of cellulose which consists essentially in reacting upon cellulose with a trioxymethylene, in the presence of a condensing agent.

2. A process of making compounds of cellulose which consists essentially in reacting upon cellulose with a trioxymethylene, in the presence of ferric chlorid.

3. A process of making compounds of cellulose which consists essentially in reacting upon cellulose with a trioxymethylene, in the presence of ferric chlorid and a dehydrating body.

4. A process of making compounds of cellulose which consists essentially in reacting upon cellulose with a trioxymethylene, in the presence of a condensing agent and a dehydrating agent.

5. A process of making compounds of cellulose, which consists essentially in treating cellulose with a material capable of forming trioxymethylene and causing the trioxymethylene thereby produced to react upon the cellulose, in the presence of a condensing agent.

6. A process of making compounds of cellulose, which consists essentially in treating cellulose with a material capable of forming trioxymethylene and causing the trioxymethlyene thereby produced to react upon the cellulose, in the presence of ferric chlorid.

7. A process of making compounds of cellulose which consists essentially in treating cellulose with a material capable of forming trioxymethylene and causing the trioxymethylene thereby produced to react upon the cellulose, in the presence of ferric chlorid and dehydrating agents.

8. A process of making cellulose compounds which consists in treating cellulose with formic aldehyde and a condensing agent, drying the product and heating the same in an oven sufficiently to form trioxymethylene and to cause the same to react with cellulose in the presence of said condensing agent.

9. A process of making cellulose compounds which comprises treating cellulose with formic aldehyde and ferric chlorid, drying in vacuum, heating in an oven sufficiently to form trioxymethylene and to cause the same to react with the cellulose in the presence of ferric chlorid.

10. As new products, the herein described addition products of trioxymethylene and cellulose.

11. As new products, formed articles of cellulosic material a portion thereof being converted into an addition product of cellulose and trioxymethylene.

In testimony whereof I affix my signature.

EMILE LÉON BLOCH-PIMENTEL.

Witness:
EMILE LEDRET.